Patented Feb. 20, 1940

2,190,750

UNITED STATES PATENT OFFICE 2,190,750

POLYAZO DYESTUFFS

Paul Zervas, Cologne-Mulheim, Germany, assignor to General Aniline & Film Corporation, a corporation of Delaware No Drawing. Application August 23, 1938, Serial No. 226,247. In Germany August 27, 1937

4 Claims. (Cl. 260—166)

The present invention relates to new polyazo dyestuffs and to a method of preparing the same; more particularly it relates to polyazo dyestuffs containing two azo groups in peri-position.

Azo dyestuffs bearing two azo-bridges in peri-position have hardly been prepared and investigated as to their usefulness until now. In Helv. chim. acta XV, 1932, pages 110 and 1342, Ruggli and coworkers describe simple representatives of this dyestuff-class. They couple 2.7-dihydroxynaphthalene twice with energetically coupling diazo compounds; besides they couple p-aminobenzene-sulfonic acid or aminobenzene in an alkaline solution with 1-amino-7-hydroxynaphthalene, further diazotize this peri-aminoazodyestuff and then couple with β-naphthol or 1.3-dihydroxybenzene. In this way they obtain peri-disazo dyestuffs the constitution of which is proved by splitting up the dyestuffs. Likewise azodyestuffs without salt-forming groups are described in German Patent 432,426 which are indirectly developed on the fiber to peri-disazo dyestuffs.

It has now been found that valuable polyazo dyestuffs which bear azo groups in peri-position are obtained, if peri-disazo dyestuffs being further diazotizable or peri-aminoazo dyestuffs are prepared by coupling 1-amino- or 2-amino-7-hydroxynaphthalenes which in the first case may contain any azo-residue in 4-position and in each case a watersolubilizing group with suitable diazo components in 8-position or in 1- and 8-position or in the case of the 1-amino-7-hydroxynaphthalene also by first diazotizing the amino group, combining with a middle or final component, and only then coupling into the 8-position, and if these peri-disazo- or peri-aminoazo dyestuffs—after reduction, saponification or treatment with phosgene if this should be necessary or desired—are diazotized or tetrazotized, as the case may be, and combined with m-diamino-, hydroxy- or m-dihydroxy compounds of the benzene series or the derivatives or the substitution products thereof, capable of coupling.

The manufacture of these new polyazo dyestuffs can accordingly take place by using e. g. 1-amino-7-hydroxynaphthalene as starting material, combining this in an acid solution with a diazo compound, coupling the dyestuff thus obtained in an alkaline solution with a saponifiable diazo compound, e. g. with formyl-1.3-diaminobenzene, saponifying this peri-aminodisazo dyestuff, tetrazotizing and combining with a final component. Furthermore an 1-amino-7-hydroxynaphthalene sulfonic acid can be employed; it is coupled in an alkaline medium with a saponifiable diazo compound, the dyestuff obtained is saponified and, as described above, further tetrazotized and coupled. On the other hand it is possible to diazotize first 1-amino-7-hydroxynaphthalene or its sulfonic acids, if desired in the form of their aryl sulfonic acid esters, to combine this diazo compound with an amino compound or final component capable of coupling, if necessary to saponify the dyestuff, to treat it with phosgene if desired, then to couple in an alkaline medium, to saponify again if necessary, to diazotize or tetrazotize, as the case may be, and so on. Moreover it is possible to start from 2-amino-7-hydroxynaphthalene or its sulfonic acids, couple these twice—once in acid and once in alkaline solution—with a diazo compound, and then to convert the peri-disazo dyestuff into a polyazo dyestuff in the manner described above.

My new azo dyestuffs correspond to the general formula:

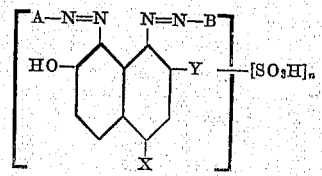

In this formula A stands for the residue of an azo dyestuff which contains as final component m-diaminobenzne, hydroxybenzene or m-dihydroxybenzene or the substitution products or derivatives thereof, B stands for one of the above named final components, namely m-diaminobenzene, hydroxybenzene, m-dihydroxybenzene, the nuclear substitution products or the derivatives thereof, or for an azo dyestuff residue which contains these compounds as final components, X stands stands either for hydrogen, —SO₃H or the radical —N=N—R, wherein R represents the radical of an aromatic compound, Y stands for hydrogen or the amino group, and n stands for a whole number.

The azo dyestuff residues designated A and B in the above formula can be built up from benzene, naphthalene and phenylpyrazolone radicals; it is to be understood that the term benzene also includes diphenyl and that whenever the above components of the azo dyestuff residues are mentioned also their N-aminobenzoylated compounds and ureas shall be included and, of course, also their usual substitution products. The final components of these azo dyestuff residues, the m-diaminobenzenes, hydroxybenzenes and m-dihydroxybenzenes may be substituted in the nucleus by alkyl, halogen, the —NO₂, the —SO₃H, and the COOH group; the m-diaminobenzenes may further be substituted in the amino groups by hydroxy-alkyl, carboxy-alkyl or sulfo-alkyl radicals. The radical —N=N—R is the radical of a diazo compound derived from amino compounds of benzene, diphenyl, naphthalene and of sulfonic acids thereof; these amines may be substituted in the nucleus by NO₂, halogen, alkyl, alkoxy and the acetamino group. The number of sulfonic acid residues present in the dyestuff molecule is usually one or two, but since the water-solubility of the dyestuffs depends on the presence of SO₃H groups their number will increase with increasing size of the dyestuff molecule.

The new watersoluble polyazo dyestuffs dye vegetable fibers directly and can, according to the final component, be developed with p-nitrodiazobenzene, β-naphthol etc. or after-treated with copper or chromium salts. All these dyeings are distinguished—while otherwise showing the same good properties—over similar dyestuffs which bear only one or no azo-bridge in peri-position, by a remarkably improved fastness to light.

The following examples illustrate the invention, without, however, restricting it thereto, the parts being by weight.

*Example 1*

13.6 parts of formyl-1.3-diaminobenzene are stirred into 60 parts of cold water, dissolved by adding 28 parts of hydrochloric acid (sp. gr. 1.15) and thereto at a temperature of 0° C. a solution of 6.9 parts of sodium nitrite is added. The diazo solution is run into a solution of 23.9 parts of 1-amino-7-hydroxynaphthalene-3-sulfonic acid in the presence of 28 parts of sodium carbonate at a temperature of 0–2° C. After finishing the coupling the dyestuff solution is mixed with 135 parts of sodium hydroxide solution (sp. gr. 1.36) and heated for 2 hours to a temperature of 40–45° C. in order to saponify the formyl group. By adding 150 parts of hydrochloric acid (sp. gr. 1.15) the dyestuff is separated and isolated. The dyestuff paste is dissolved in about 1200 parts of water and some sodium hydroxide solution, 15 parts of sodium nitrite and 70 parts of hydrochloric acid (sp. gr. 1.15) are added at 0° C., and indirectly tetrazotized for one to two hours. When the tetrazotization is finished the excess of nitrite is destroyed with some amino sulfonic acid and a solution of 21.6 parts of 1.3-diaminobenzene is added. By slowly adding a solution of 35 parts of sodium acetate the coupling is brought to an end within about 6 hours. Then the mixture is neutralized by adding sodium carbonate solution and the formed dyestuff is isolated. It represents in dry form a dark powder which is easily soluble in water and dyes cotton yellowish brown shades. By after-treatment with p-nitrodiazobenzene a reddish-brown fast to light is obtained. The dyestuff has in the free state the following constitution:

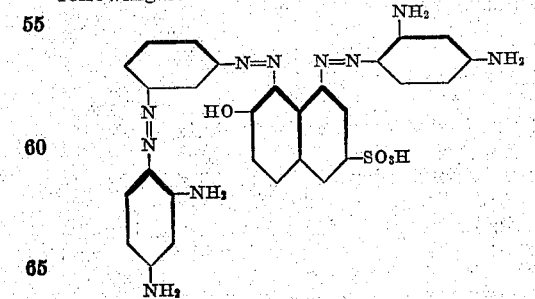

*Example 2*

39.3 parts of 1-amino-7-(p-toluenesulfonyl)-hydroxy-naphthalene-4-sulfonic acid are dissolved in 700 parts of water and by adding 28 parts of hydrochloric acid (sp. gr. 1.15) and at 22–25° C. a solution of 6.9 parts of sodium nitrite diazotized. Diazotization takes about 2 hours. Then 10.7 parts of 3-amino-1-methylbenzene, dissolved in little water and 14 parts of hydrochloric acid (sp. gr. 1.15) are added. The coupling is made complete within 24 hours by gradually adding a solution of 15 parts of sodium acetate. The isolated dyestuff paste is stirred into 500 parts of water, mixed with 250 parts of sodium hydroxide solution (sp. gr. 1.36) and heated for three hours up to 80–85° C.; when the saponification is complete a reddish-brown solution results. By adding 250 parts of hydrochloric acid (sp. gr. 1.19) the dyestuff is precipitated and then sucked off. The dyestuff paste is dissolved in about 800 parts of water and some sodium carbonate and combined in the presence of 28 parts of sodium carbonate with a diazo solution of 13.6 parts of formyl-1.3-diaminobenzene, obtained according to Example 1, at a temperature of −5° C. to −2° C. When the coupling is complete 135 parts of sodium hydroxide solution (sp. gr. 1.36) are added and heated for 2 hours to 60° C. The saponified dyestuff is precipitated by adding 150 parts of hydrochloric acid (sp. gr. 1.19) and isolated. The dyestuff paste is dissolved, sodium carbonate being added, tetrazotized according to Example 1 and coupled with 21.6 parts of 1.3-diaminobenzene. The isolated dyestuff dyes cotton directly reddish-brown shades, which change into a beautiful brown fast to light, when treated with p-nitrodiazobenzene. The dyestuff corresponds in the free state to the following formula:

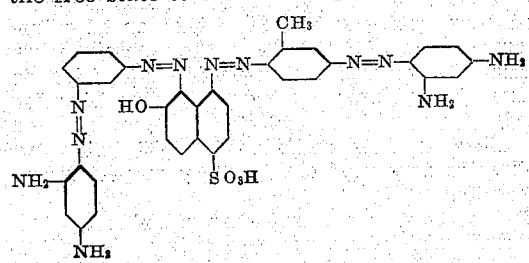

*Example 3*

The dyestuff paste obtained according to Example 2 by coupling the diazo compound of 39.3 parts of 1-amino-7-(p-toluenesulfonyl)-hydroxy-naphthalene-4-sulfonic acid with 10.7 parts of 3-amino-1-methylbenzene and saponifying is treated in a solution rendered alkaline by sodium carbonate with phosgene at 60° C. When the treatment with phosgene is finished the precipitated dyestuff is isolated and, as described in Examples 1 and 2, coupled in sodium carbonate alkaline solution with a diazo solution of 13.6 parts of formyl-1.3-diamino-benzene, saponified, tetrazotized and combined with 21.6 parts of 1.3-diaminobenzene. The dyestuff represents a dark powder and dyes cotton reddish-brown shades and yields, when developed brown shades. The dyestuff corresponds in the free state to the following formula:

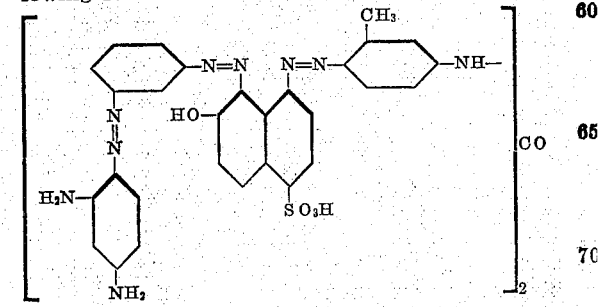

*Example 4*

15.9 parts of 1-amino-7-hydroxynaphthalene are dissolved in 14 parts of hydrochloric acid (sp. gr. 1.19) and 250 parts of water and at 10–15° C. combined with a diazo solution prepared from 17.3 parts of p-aminobenzene sulfonic acid. The coupling which begins at once, is made complete by adding a solution of 10 parts of sodium acetate. After 5 hours the mixture is heated for a short time to 40° C. and the dyestuff formed is isolated. The dyestuff paste is dissolved in 2000 parts of water and combined in the presence of 28 parts of sodium carbonate with a diazo solution of 13.6 parts of formyl-1.3-diaminobenzene at 3–5° C. When the coupling is complete the mixture is saponified by adding 180 parts of sodium hydroxide solution (sp. gr. 1.36) and heating to 40° C. for 2 hours, made acid to Congo red paper by adding 250 parts of hydrochloric acid (sp. gr. 1.19), and the dyestuff is isolated. The dyestuff paste is suspended in 3000 parts of water, rendered just alkaline with sodium hydroxide solution and indirectly diazotized by adding 500 parts of ice, 15 parts of sodium nitrite and 150 parts of hydrochloric acid (sp. gr. 1.19) for two hours at 3–5° C. After destroying the excess of nitrous acid a solution of 10.8 parts of 1.3-diaminobenzene and 18.8 parts of 1.3-diaminobenzene-4-sulfonic acid are added to the diazotization mixture. By adding drop by drop a solution containing 60 parts of sodium carbonate the coupling is finished. The isolated dyestuff represents a dark powder, which dyes cotton yellowish brown shades and yields a full brown when treated with p-nitrodiazobenzene. The dyestuff corresponds in the free state to the following formula:

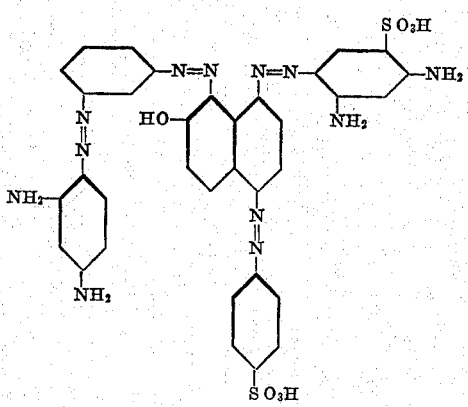

If in this example the p-aminobenzene sulfonic acid is replaced by m- or o-aminobenzene sulfonic acid or by an acetylphenylene diamine sulfonic acid or by an aminonaphthalene sulfonic acid dyestuffs of similar properties are obtained.

*Example 5*

39.3 parts of 1-amino-7-(p-toluenesulfonyl)-hydroxy-naphthalene-4-sulfonic acid are diazotized as described in Example 2, combined with 13.8 parts of 1-hydroxybenzene-2-carboxylic acid in sodium carbonate alkaline solution and saponified in the manner stated in Example 2. The dyestuff paste obtained is dissolved and combined with the coupling product obtained from the tetrazo compound of 18.4 parts of 4.4'-diaminodiphenyl (0.1 mol) and 13.8 parts of 1-hydroxybenzene-2-carboxylic acid (0.1 mol) in sodium carbonate alkaline medium. The dyestuff is isolated by adding salt and represents a brown powder, which dyes cotton reddish-brown shades yielding a yellowish-brown when after-treated with chromium salts. It corresponds in the free state to the following formula:

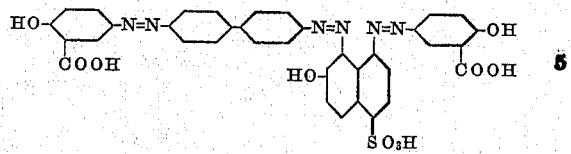

*Example 6*

41.6 parts of the dyestuff from diazotized formyl-1.3-diaminobenzene-4-sulfonic acid and 1-(4'-aminophenyl)-3-methyl-5-pyrazolone are indirectly diazotized in the usual manner, combined with 23.9 parts of 1-amino-7-hydroxynaphthalene-4-sulfonic acid in alkaline medium and, when the coupling is complete, saponified by adding sodium hydroxide solution and heating to 40° C. The isolated dyestuff is tetrazotized according to Example 4 and is coupled with a solution of 30.4 parts N-hydroxyethyl-1.3-diaminobenzene. The dyestuff dyes cotton yellowish-brown shades and is developed to a red-brown by aftertreatment with p-nitrodiazobenzene. It corresponds in the free state to the following formula:

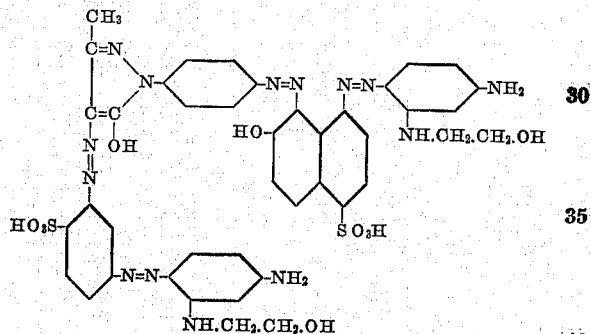

*Example 7*

39.3 parts of 1-amino-7-(p-toluenesulfonyl)-hydroxynaphthalene-4-sulfonic acid are diazotized according to Example 2, mixed with a hydrochloric solution of 12.2 parts of 2.4-diamino-1-methylbenzene, and the beginning coupling is made complete by gradually adding sodium acetate solution. The isolated dyestuff is saponified in the usual manner by heating it to 80° C. in sodium hydroxide alkaline solution and precipitated from the solution by adding hydrochloric acid. The dyestuff paste is stirred into 1500 parts of water, rendered alkaline and combined with the coupling product obtained from the tetrazo compound of 18.4 parts of 4.4'-diaminodiphenyl (0.1 mol) and 13.8 parts of 1-hydroxybenzene-2-carboxylic acid (0.1 mol). The formed dyestuff is precipitated by adding salt and isolated; it dyes cotton yellowish-brown shades of good fastness to light and corresponds in the free state to the following formula:

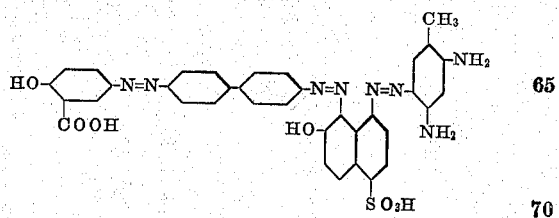

If in this example the coupling product obtained from 0.1 mol tetrazotized benzidine and 0.1 mol salicylic acid is replaced by the coupling product obtained from 0.1 mol tetrazotized p-aminobenzoyl-p-phenylenediamine and 0.1 mol salicylic

Example 8

A solution of 23.9 parts of 2-amino-7-hydroxy-naphthalene-6-sulfonic acid is united at 5° C. with a diazo solution obtained from 13.6 parts of formyl-1.3-diaminobenzene according to Example 1. After gradually adding sodium acetate solution until the acid reaction to Congo red paper has disappeared, the coupling is finished within 24 hours. Then the mixture is neutralized with sodium carbonate and coupled, after adding 28 parts of sodium carbonate, again with a diazo solution obtained from 13.6 parts of formyl-1.3-diaminobenzene. When the coupling is complete the formed diazo dyestuff is saponified according to Example 1, indirectly tetrazotized and coupled with a mixture of 10.8 parts of 1.3-diaminobenzene and 16.6 parts of m-aminophenylglycine. The isolated dyestuff dyes cotton, when aftertreated with p-nitrodiazobenzene, reddish-brown shades of good fastness properties. It corresponds in the free state to the following formula:

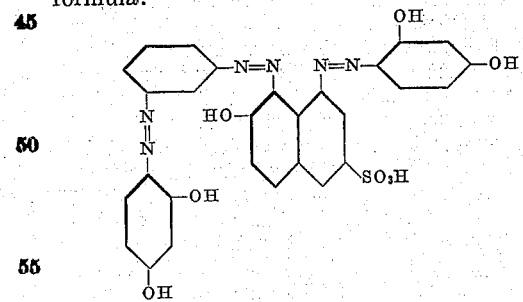

Example 9

The tetrazo compound of the saponified dyestuff obtained from 13.6 parts of formly-1.3-diaminobenzene and 23.9 parts of 1-amino-7-hydroxynaphthalene-3-sulfonic acid according to Example 1 is combined with 22 parts of 1.3-dihydroxybenzene. The coupling and isolation of the dyestuff takes place according to Example 1. The dyestuff dyes cotton reddish-brown shades. When aftertreated with p-nitrodiazobenzene a yellowish-brown shade is obtained. The dyestuff corresponds in the free state to the following formula:

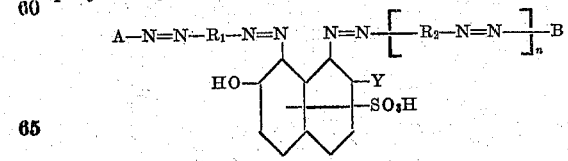

I claim:

1. As new products water-soluble substantive polyazo dyestuffs of the general formula:

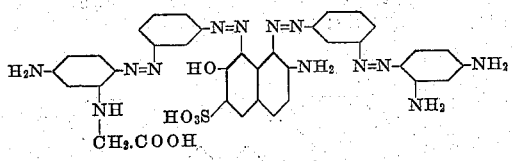

wherein A and B stand for radicals of final components selected from the group consisting of m-diaminobenzene, hydroxybenzene, m-dihydroxybenzene, the alkyl, halogen, $NO_2$, $SO_3H$, COOH nuclear substitution products thereof and the N-hydroxyalkyl-, N-carboxyalkyl-, N-sulfoalkyl-derivatives of the said diamines, $R_1$ stands for one of the group consisting of monocyclic and bicyclic aromatic radicals, $R_2$ stands for one of the group consisting of the benzene nucleus, of alkyl substituted and alkoxy substituted benzene nuclei, Y stands for a member selected from the group consisting of hydrogen and $NH_2$, and $n$ stands for one of the values 1 and 0.

2. As new products water-soluble substantive polyazo dyestuff of the general formula:

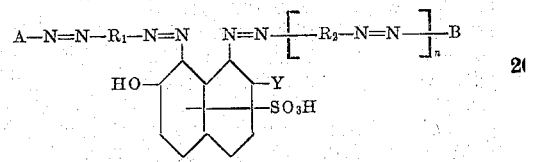

wherein A and B stand for radicals of final components, selected from the group consisting of m-diaminobenzene, hydroxybenzene, m-dihydroxybenzene, the alkyl, halogen, $NO_2$, $SO_3H$, COOH nuclear substitution products thereof and the N-hydroxyalkyl-, N-carboxyalkyl-, N-sulfoalkyl-derivatives of the said diamines, $R_1$ stands for a benzene radical, $R_2$ stands for one of the group consisting of the benzene nucleus, of alkyl substituted and alkoxy substituted benzene nuclei, Y stands for a member selected from the group consisting of hydrogen and $NH_2$, and $n$ stands for one of the values 1 and 0.

3. As new product the watersoluble substantive polyazo dyestuff corresponding in its free state to the formula:

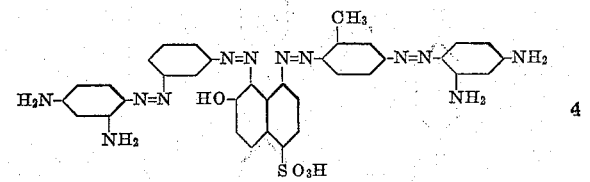

dyeing cotton directly reddish-brown shades which change into a beautiful brown fast to light when aftertreated with p-nitrodiazobenzene.

4. As new product the watersoluble substantive polyazo dyestuff corresponding in its free state to the formula:

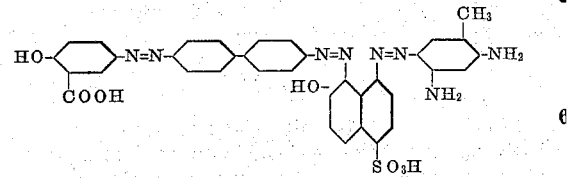

dyeing cotton directly yellowish-brown shades of good fastness to light.

PAUL ZERVAS.